June 17, 1969     W. SOHN     3,450,361

TAPE COUNTER DRIVE MECHANISM

Filed April 27, 1966

Inventor:
Werner Sohn
By: Spencer & Kaye
Attorneys 3,450,361
TAPE COUNTER DRIVE MECHANISM
Werner Sohn, Constance, Germany, assignor to Telefunken Patentverwertungsgesellschaft m.b.H., Ulm (Danube), Germany
Filed Apr. 27, 1966, Ser. No. 545,659
Claims priority, application Germany, May 6, 1965, T 28,527
Int. Cl. G11b 15/44; B65h 25/04; G01b 3/12
U.S. Cl. 242—55.12                    6 Claims

ABSTRACT OF THE DISCLOSURE

A drive mechanism for a tape recorder counter using a differential drive in which the sun gears are connected with the tape spindles and the planetary gears drive the counter shaft.

---

The present invention relates to a drive mechanism for a counter for a magnetic tape recorder.

Magnetic tape recorders are customarily equipped with a counter mechanism which permits portions of the tape to be located and/or identified at will. In most tape recorders, and in virtually all tape recorders intended for home use, the counter mechanism is equipped with counter wheels which are driven by means of a belt drive from the right or left-hand reel, there being a suitable step-up or step-down gearing arrangement so that the counter actually counts the number of revolutions of the reel. Thus, such counters do not give a true indication of the running time or the length of the tape which has been used. However, such counters are considered to be adequate if any given point along the tape does not have to be determined with an especially high degree of accuracy. Although such counters are suitable for home use, for commercial, studio operations, this type of counter is not sufficiently accurate since errors are introduced not only by the changes in the diameter of the quantity of tape on the reel but also by the slippage of the reel. Thus, for example, for editing of the tape, highly accurate counters are required and the inaccuracies introduced by such counters render the editing more difficult.

Therefore, in tape recorders in which a position on the tape has to be determined with a high degree of accuracy, the counter which measures the position of the tape in units of time or length is driven directly by the magnetic tape. In that case, it is the particular use to which the tape recorder is put which determines the type of counter. For the measuring of the tape in which the tape recorder operates at many different speeds, the counter will preferably be calibrated in meters and fractions thereof, as this provides an indication at all times as to the extent of used tape and to the extent of the remaining tape. However, for tape recorders intended for radio and television studios, it is the time duration of the individual recordings which is of primary importance so that the counting mechanism is, for this application, preferably calibrated in units of time.

One practical drawback of counters which are driven by the tape itself is that such counters are more expensive than the counters driven by the spindles which rotate the reels, since tape driven counters require more components and these components must be manufactured with a high degree of precision. Additional components are required because in order to derive a drive directly from the magnetic tape, the tape is made to loop over a large driving roller which must be precisely manufactured. However, even if the driving roller for the counter is made with the required precision so that the diameter of the roller is sufficiently accurate, the accuracy of the counter indication can be adversely influenced by slippage which itself is influenced by mechanical friction. Moreover, the roller has to have a relatively small moment of inertia in order to permit the direction of travel of the tape to be reversed. However, even when these requirements are met, there will still be a certain amount of slippage whenever the direction of travel of the tape is reversed resulting in an inaccurate indication. Another drawback of such counters is that due to the fact that the path of the tape has to include a loop about the driving roller, the threading of the tape is rendered more difficult.

It is therefore a primary object of the present invention to provide a counter for a magnetic tape recorder which overcomes the aforementioned disadvantages of the prior art.

It is another object of the present invention to provide a highly accurate counter for a magnetic tape recorder which eliminates the need for a driving roller which is looped by the magnetic tape as has heretofore been required in prior art arrangements.

With the above objects in view, the present invention resides in a drive mechanism for a tape recorder counter in which there is arranged on the drive shaft for the counter a differential drive which is coupled with the spindles for rotating the tape reels. In accordance with the present invention, the differential drive includes a planet carrier arranged on the drive shaft for the counter for carrying at least one planet pinion of a planetary gear arrangement, with two sun gears which engage the planet pinion to form the differential drive being freely rotatable on the drive shaft and each being connected for rotation with a respective tape reel spindle of the tape recorder.

Additional objects and advantages of the present invention will become apparent upon consideration of the following description when taken in conjunction with the accompanying drawings in which.

Figure 1:
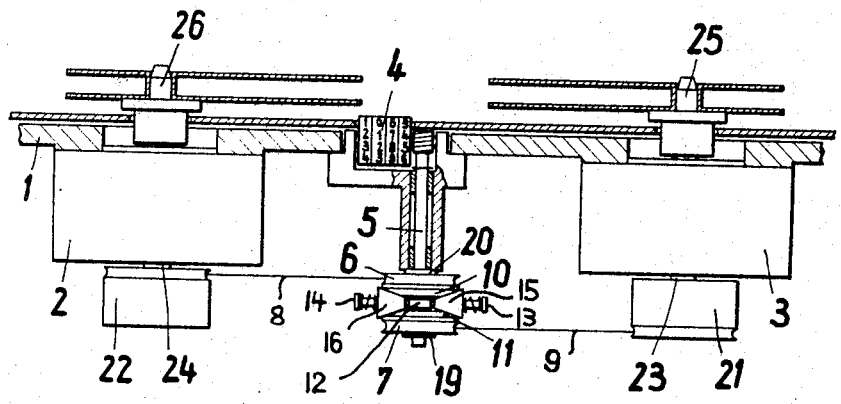
FIGURE 1 is a side view, partly in cross section, of a counter drive in accordance with the present invention and also showing the drive mechanism for the tape recorder.

Referring now to the drawings, there is shown in FIGURE 1 the deck 1 of a magnetic tape recorder which carries the drives 2 and 3 for the spindles which rotate the tape reels as well as carrying a counter 4. In the illustrated embodiment, the counter is shown as being equipped with wheels which are calibrated in terms of length. However, in practice, the counter may also be calibrated in units of time. As shown, the counter includes a drive shaft 5 the upper end of which drives the calibrated wheels of the counter and at the lower end of which, there is provided a differential drive formed from a planetary gear arrangement having two sun gears 6 and 7. These sun gears are mounted at the lower end of the drive shaft 5 and are freely rotatable thereabout.

Figure 2:
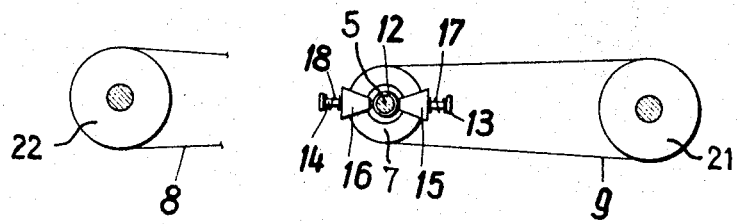
FIGURE 2 is a plan view of a portion of the arrangement of FIGURE 1 with one of the sun gears and the connection thereof to a reel spindle not being shown.

In the illustrated embodiment, the sun gears 6 and 7 have conical portions 10 and 11, respectively, these portions being provided with friction surfaces. As shown, in FIGURE 2, a ring 12 is mounted on the drive shaft 5 for rotation therewith and carries axles 13 and 14 on which planet pinions 15 and 16, respectively, are freely rotatable, the ring and axles forming the planet carrier. These planet pinions form a portion of the differential drive and are shown as being in the form of bevelled friction wheels disposed between the sun gears 6 and 7 for engaging the friction surfaces thereof. The planet pinions are pressed inwardly by means of pressure springs 17 and 18 provided on the axles 13 and 14, respectively, so that there is obtained a silent, accurate and slip free operation of the thus formed differential drive.

As shown, the sun gears 6 and 7 are held in the proper axial position by means of locking rings 19 and 20 and thus are arranged for frictional engagement with the planet pinions 15 and 16. The two sun gears are driven by the tape reel drives by means of suitable connections, these connections being shown as belts 8 and 9 which run over pulleys 21 and 22, respectively, with the pulley 21 being connected for rotation with spindle 25 via shaft 23 and the pulley 22 being connected for rotation with spindle 26 via shaft 24. These belts preferably provide a positive drive rather than a frictional drive, for example, these belts may be in the form of toothed belts or sprocket chains. However, in lieu of the toothed belts, round belts or ball type belts can be used.

The operation of the drive mechanism according to the present invention is such that when the diameter of the tape wound on the tape reels carried by the spindles 25 and 26 is exactly equal to each other, the planet pinions 15 and 16 will transmit the rotation of the sun gears 6 and 7 to the shaft 5 of the counter, the two sun gears rotating in the same direction. In the course of this motion, the planet pinions 15 and 16 will not rotate about their own axes since both the upper and lower sun gears 6 and 7, respectively, are rotating at the same speed. It is this condition which determines the transmission ratio for the differential drive.

If, now, the diameter of the tape portions wound on the two tape reels is different, the sun gears 6 and 7 will be rotated at different speeds. Therefore, the planet pinions 15 and 16 will rotate about their own axes so as to provide the necessary compensation for the difference in rotational speeds and as a result of which, the shaft 5 will rotate at the same speed and the counter 4 will thus provide for an accurate indication of any given tape position.

It will thus be seen that, in accordance with the present invention, there is provided a simple, inexpensive, sturdy and accurate drive system whih can easily be built onto any commercially available counter or, if necessary due to spatial requirements, can readily be connected with any conventional counter by means of a belt. In practice, it is advantageous if the counter and the differential drive are combined into a single unit which can then readily be built into the tape recorder, either at the factory or in the field.

It should be noted that the above described structure will operate as described even if, for example, there is but one planet pinion arranged between the two sun gears. Also, even though the planetary gear arrangement has been described as incorporating friction elements, gears, for example, bevel or spur gears, may be incorporated into the arrangement without any disadvantages resulting therefrom.

It will be understood that the above description of the present invention is susceptible to various modifications, changes, and adaptations.

What is claimed is:

1. A drive mechanism for a counter of a magnetic tape recorder comprising, in combination: drive means for rotating tape reels of the tape recorder and including rotatable spindles; a counter for indicating any given position of a tape played on the recorder; a drive shaft coupled to said counter for driving the same; a planetary gear arrangement mounted on said drive shaft for said counter for rotating the same, said gear arrangement including a planet carrier fixedly mounted on the drive shaft and having at least one planet pinion carried thereby, and a plurality of sun gears mounted for free rotation about said drive shaft and arranged for coacting with said at least one planet pinion to form a differential drive to be rotated in the same direction with a given direction of tape movement; and means coupling each sun gear for rotation with a respective spindle such that rotation of said spindles results in said counter being driven so as to provide that the counter is always moved the same amount per length of tape passing through the tape recorder.

2. A drive mechanism as defined in claim 1 wherein said at least one planet pinion and said sun gears are constituted by bevelled friction wheels.

3. A drive mechanism as defined in claim 2 and further comprising spring means associated with said at least one planet pinion for pressing the surface of such pinion against the bevelled surfaces of said sun gears.

4. A drive mechanism as defined in claim 1 wherein said coupling means between said sun gears and said spindles are constituted by toothed belts.

5. A drive mechanism as defined in claim 1 wherein said differential drive and said counter are combined to form a single unit.

6. A drive mechanism as defined in claim 3 wherein two sun gears are provided and said at least one pinion is arranged between said two sun gears for engagement therewith.

References Cited

UNITED STATES PATENTS

| 2,477,146 | 7/1949 | Scherbatskoy | 242—54.1 |
| 2,954,939 | 10/1960 | Herrmann | 242—55.12 |
| 3,327,958 | 6/1967 | Tolnai | 242—55.14 |

GEORGE F. MAUTZ, *Primary Examiner.*

U.S. Cl. X.R.

33—142; 242—57